United States Patent [19]

Geis et al.

[11] Patent Number: 5,785,082
[45] Date of Patent: *Jul. 28, 1998

[54] IN-LINE FUEL FILL VALVE

[75] Inventors: Charles A. Geis, Pittsburgh; Robin N. Borland, McMurray; Dino V. Sciullo, Pittsburgh, all of Pa.; Alan J. Porter, Livonia, Mich.

[73] Assignee: Superior Valve Company, Washington, Pa.

[*] Notice: The term of this patent shall not extend beyond the expiration date of Pat. No. 5,474,104.

[21] Appl. No.: 571,292

[22] Filed: Dec. 12, 1995

Related U.S. Application Data

[63] Continuation-in-part of Ser. No. 372,960, Jan. 17, 1995, Pat. No. 5,474,104.

[51] Int. Cl.[6] .................................................. F16K 17/168
[52] U.S. Cl. ................... 137/516.29; 137/599; 141/18; 251/148; 251/172
[58] Field of Search ................... 137/599, 543.21, 137/516.29, 540; 141/2, 18; 251/148, 150, 151, 152, 172

[56] References Cited

U.S. PATENT DOCUMENTS

| | | |
|---|---|---|
| 848,178 | 3/1907 | Kingsley. |
| 873,984 | 12/1907 | Bobrick. |
| 2,111,430 | 3/1938 | Lamar. |
| 3,605,802 | 9/1971 | Hertell ................ 137/516.29 X |
| 3,754,568 | 8/1973 | Gallagher et al. ........... 137/516.29 |
| 4,016,899 | 4/1977 | Fletcher. |
| 4,307,748 | 12/1981 | Mathias. |
| 4,530,373 | 7/1985 | Bork et al. ................. 251/172 X |
| 4,848,394 | 7/1989 | Rothschild. |
| 5,351,726 | 10/1994 | Diggins. |
| 5,474,104 | 12/1995 | Borland et al. ............. 137/599 X |

OTHER PUBLICATIONS

Parker Hannifin Corporation brochure, Nov. 1992.
Stäubli Corporation brochure, Mar. 1992.
Sherex Industries brochure, Sep. 1991.
Sherex Industries brochure, Apr. 1992.
Sherex Industries brochure, Dec. 1991.

*Primary Examiner*—Stephen M. Hepperle
*Attorney, Agent, or Firm*—Killworth, Gottman, Hagan & Schaeff LLP

[57] ABSTRACT

An in-line fuel fill valve assembly which provides for rapid and efficient refueling of compressed natural gas powered vehicles is provided and includes a receptacle adapted to mate with a fuel supply nozzle and a valve body having an in-line gas flow passage therethrough. The gas flow passage has first and second ends, with the first end communicating with the receptacle, and the second end terminating at an outlet which is adapted to communicate with a fuel storage vessel. A check valve is positioned in the gas flow passage of the valve body and is normally biased into a closed position to prevent the flow of gas through the first gas flow passage, but which opens in response to a flow of fuel under pressure.

12 Claims, 5 Drawing Sheets

5,785,082

1

IN-LINE FUEL FILL VALVE

CROSS REFERENCE TO RELATED APPLICATION

This application is a continuation-in-part of U.S. application Ser. No. 08/372,960, filed Jan. 17, 1995, and entitled REFUELING CHECK VALVE FOR COMPRESSED NATURAL GAS POWERED VEHICLES, now U.S. Pat. No. 5,474,104, issued Dec. 12, 1995, the disclosure of which is incorporated by reference.

BACKGROUND OF THE INVENTION

This invention relates to an in-line fuel fill valve assembly, and more particularly to such a valve assembly for use in compressed natural gas (CNG) powered vehicles.

Because of environmental concerns and emissions laws and regulations, manufacturers of motor vehicles are searching for a clean burning and cost efficient fuel to use as an alternative to gasoline. Natural gas is one candidate for such a purpose, and many vehicles have been converted to natural gas as a fuel source. Typically, the natural gas is stored on board the vehicle in compressed form in one or more pressurized cylinders. After the fuel is expended, there is a need to be able to refill the cylinders under pressure in a safe, -fast, and efficient manner.

Refueling valves which control the supply of compressed natural gas (CNG) to the cylinders in a vehicle are exposed to large variations in environmental conditions. For example, wide variations in temperatures and pressures may be encountered. During refueling operations, instantaneous temperature drops of at least 50° F. (28° C.) are common. Temperatures may exceed ambient by 20° F. (10° C.) or more toward the end of refueling. This variation in temperature, as well as the rapid increases in pressure during refueling, may result in the nominal working pressure in a gas cylinder varying from several hundred up to several thousand pounds per square inch (psi) (from less than a hundred to several hundred kilograms per square centimeter). Thus, the refueling valve must be able to handle high gas pressures up to 4,500 psi (315 kg/cm$^2$) without leakage or failure.

Additionally, nozzles transferring the compressed natural gas fuel through the refueling valves under these high pressures must be able to be fully depressurized prior to being disconnected from the refueling valves. Also, in view of the long lives of the vehicles and the potential for many thousands of refuelings over the life of a vehicle, the refueling valves must be able to withstand many thousands of refueling cycles. Finally, if servicing or replacement of a valve is necessary, the system must be able to be vented and depressurized readily.

Currently, refueling valves are designed with a receptacle adapted to mate with a fueling nozzle and have a check valve positioned within the receptacle. Such designs, however, may be difficult to service or replace. Other designs may allow moisture to become trapped in the valve, which may result in icing of the valve (i.e., ice forming on sealing surfaces to prevent the valve from fully opening or closing) due to rapid pressure changes during fueling or venting. Accordingly, the need exists in this art for a refueling valve which provides for easy refueling and yet is convenient to service or replace (i.e., providing a by-pass mechanism within the valve assembly itself).

SUMMARY OF THE INVENTION

The present invention meets that need by providing an in-line fuel fill valve assembly which provides for rapid and efficient refueling of compressed natural gas powered vehicles. The fuel fill valve assembly also permits convenient depressurization of the vehicle fuel system prior to servicing and maintenance thereof.

In accordance with one aspect of the present invention, an in-line fuel fill valve assembly for a compressed natural gas vehicle is provided and includes a receptacle with a first end adapted to mate with a fuel supply nozzle and a valve body having an in-line gas flow passage therethrough. The gas flow passage has first and second ends, with the first end of the gas flow passage communicating with the receptacle, and the second end of the gas flow passage terminating at an outlet which is adapted to communicate with a fuel storage vessel or tank. By "in-line", we mean that the valve assembly provides a substantially straight flow path for the gaseous fuel from the receptacle to the outlet of the valve assembly during fueling.

The valve assembly also includes a check valve positioned in the gas flow passage of the valve body. The check valve is normally biased, such as for example by a spring, into a closed position to prevent the flow of gaseous fuel through the gas flow passage. The check valve opens in response to a flow of fuel of greater pressure through the receptacle to permit the fuel storage vessel to be filled. The check valve includes a poppet head which is adapted to seal against a valve seat in the gas flow passage. To insure that the poppet provides a tight seal, there also is an O-ring which is captivated by the retainer member and against which the poppet head seals. In a preferred form of the invention, the O-ring is protected by the retaining member and is positioned out of the path of gas flow through the gas flow passage. The retaining member may also include a bleed port therein which communicates with the O-ring and permits the buildup of pressure against the O-ring to insure a secure seal. In a preferred embodiment, the opposite end of the receptacle is adapted to be secured within the valve body and to seal against the retainer member.

The poppet head also preferably includes a shaft which extends from the head. A spring biases the poppet head against the valve seat and O-ring. A slidable poppet guide may also be included in the flow passage. The guide includes an annular opening therein into which the shaft of the poppet is slidably fitted.

Preferably, a second gas flow passage may also be located in the valve body and provides a second gas flow path around the check valve in the gas flow passage. A by-pass valve is positioned in a second gas flow passage which is normally closed, but which is operable to permit venting of gas from the fuel storage vessel through the receptacle when it is opened. The bypass valve includes a gasket adapted to seal against a valve seat in the second gas flow passage and a Belleville spring which exerts a live sealing load on the gasket. Such a gasket may be comprised of, for example, a polyamide.

Optionally, a filter for removing particulate matter from the fuel may be positioned in the valve assembly. Preferably, the filter is positioned in-line between the check valve and the fuel storage vessel. A dust cap may also be provided to fit over an end of the receptacle to protect the receptacle from the environment.

The in-line construction of the valve assembly provides a straight-through flow path for the gas which prevents entrapment of moisture which could otherwise cause icing problems with the valve during succeeding fuel fill cycles. The by-pass feature permits convenient venting and gas recovery from the fuel storage tanks prior to servicing or maintenance of the valve assembly.

Accordingly, it is a feature of the present invention to provide for rapid and efficient refueling of compressed natural gas powered vehicles using an in-line fuel fill valve assembly. It is another feature of the present invention to permit depressurization of the vehicle fuel system and recovery of gaseous fuel prior to servicing and maintenance thereof. These, and other features and advantages of the present invention, will become apparent from the following detailed description, the accompanying drawings, and the appended claims.

DETAILED DESCRIPTION OF THE PREFERRED EMBODIMENT

Figure 1:
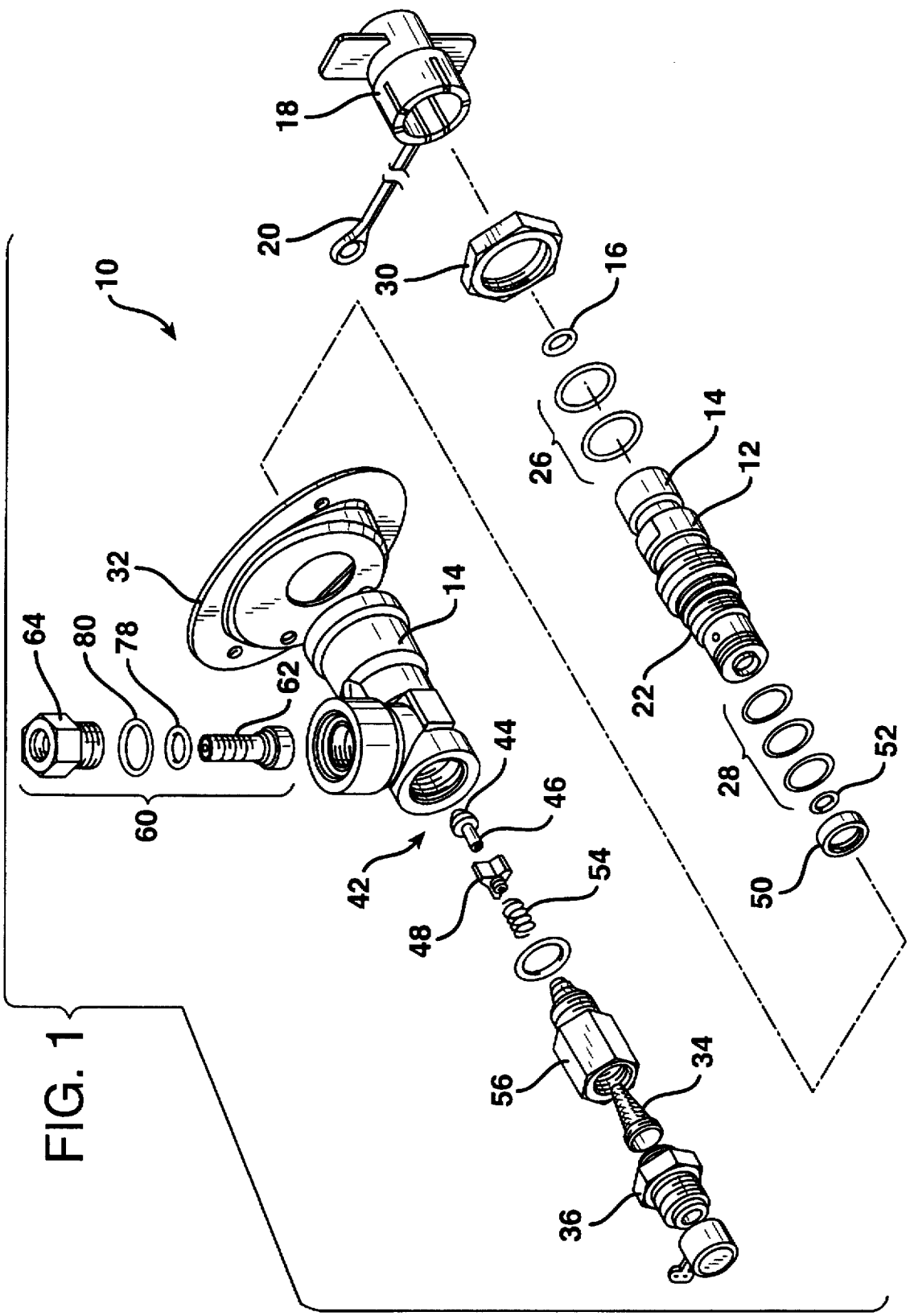
FIG. 1 is an exploded perspective view of the fuel fill check valve assembly of the present invention.
Figure 2:
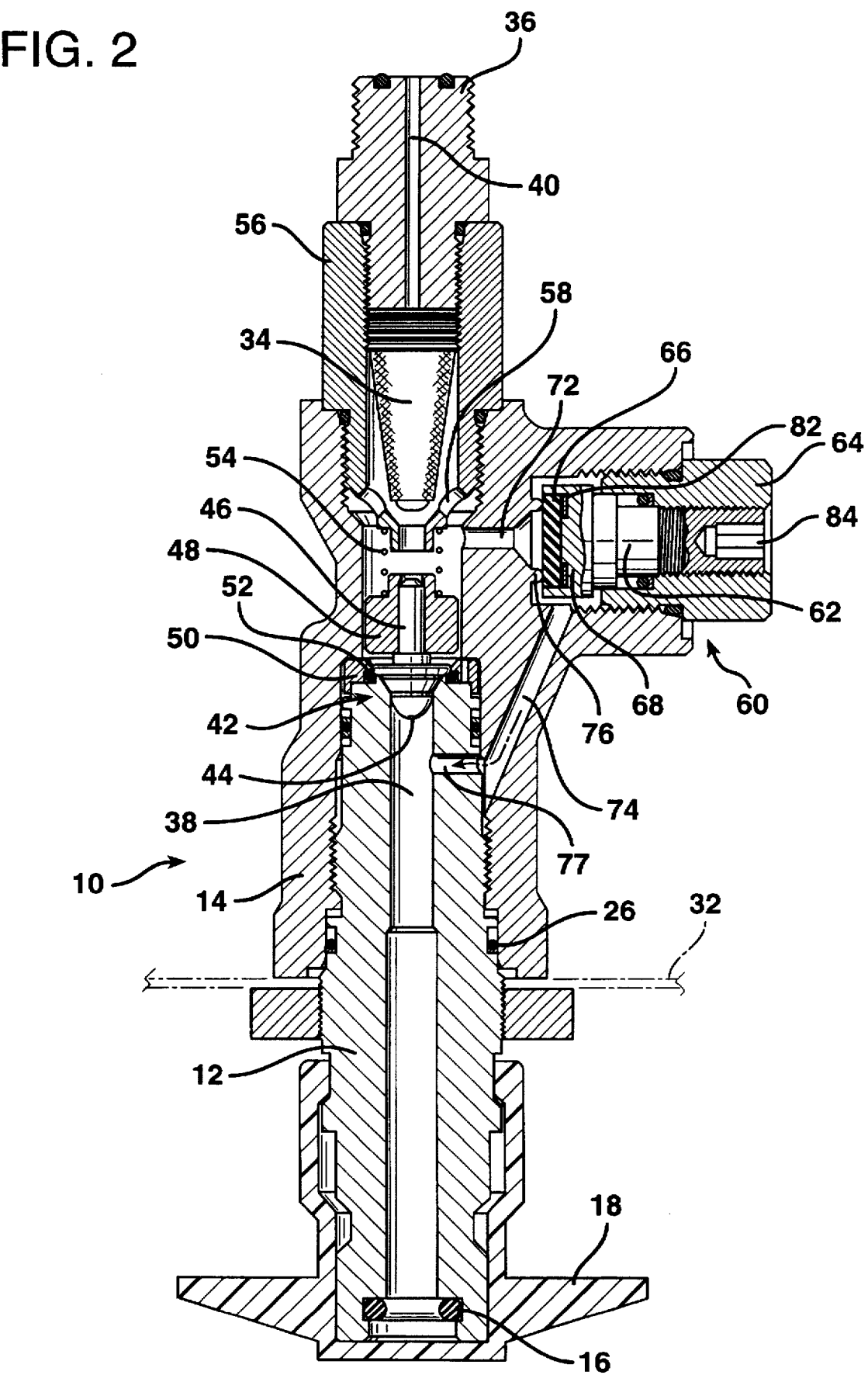
FIG. 2 is a side view, in cross-section, of the check valve assembly.

Referring now to FIGS. 1 and 2, there are illustrated, respectively, an exploded perspective view and an assembled cross-sectional view, of the in-line fuel fill valve assembly (generally indicated at 10) of the present invention. Assembly 10 includes a receptacle 12 and a valve body 14. Both receptacle 12 and valve body 14 are preferably manufactured of suitable corrosion-resistant metals such as anodized aluminum, stainless steel, or brass. Receptacle 12 has a first end 14 having an internal O-ring 16 for mating and sealing with a standard gaseous fuel supply nozzle (not shown). Receptacle 12 preferably has an exterior profile which will mate with standard CNG fuel nozzles. For example, the profile may be in compliance with ANSI draft specification NGV 1 (Sep. 16, 1993) for fueling connection devices. Internally, the receptacle should include a sealing surface such as provided by internal resilient O-ring 16. Preferably, O-ring 16 is fabricated of a nitrile rubber or other suitable material designed for low temperature resiliency.

An optional dust cap 18, fabricated of a suitable resilient plastic or the like, is designed to fit over the end of receptacle 12 to protect it from environmental contaminants, nicks, and abrasions between fuel refuelings. Dust cap 18 is secured to receptacle 12 by any suitable means such as by manufacturing the dust cap with split legs having internally extending lips which frictionally fit over the body of receptacle 12 (as best shown in FIG. 2). A tether 20 may be secured to the body of a vehicle to insure that cap 18 is not lost. It will also be apparent that other constructions may be used for dust cap 18 and to secure it to the receptacle.

Receptacle 12 is designed to be secured within valve body 14 via external threads 22 which mate with corresponding internal threads 24 (FIG. 2) on valve body 14. Separate sets of resilient backup and O-rings 26, 28 may be used to insure a gas-tight seal. Again, it is preferred that the O-ring seals used in the check valve assembly be fabricated of nitrile rubber or other suitable material for good low temperature performance. A jam or retaining nut 30 in conjunction with a flange 32 secures the assembly 10 to an exterior surface of a vehicle wall (not shown) so that valve body 14 is interior of the vehicle wall while an end of receptacle 12 extends outwardly from the wall for easy access for refueling.

As best shown in FIG. 2, receptacle 12 threads snugly against retainer member 50 to secure it into position to form a valve seat against which check valve 42 seals. As will be explained in greater detail below, a resilient O-ring 52 is captivated within retainer member 50 to provide the seal against the poppet head 44 of check valve 42. Further, the O-ring is positioned out of the flow path of the pressurized fuel to prevent it from becoming dislodged from retainer member 50 by the force of the gas flow.

At the opposite end of valve body 14 adjacent the outlet at then end of passage 40, an optional filter 34 may be positioned directly in the flow path of the refueling compressed gas. Filter 34 entraps any particles or contaminants in the fuel and insures that the compressed gas fuel in the system is clean. Further, by entrapping any particulate matter in the filter, such particulates are prevented from interfering with the sealing of the check valve in valve assembly 10 or with any other valves throughout the fuel system of the vehicle. Filter 34 is retained in position by a threaded fitting 36. Due to its position and the construction of outlet fitting 36, it can be readily replaced without disturbing the remainder of the check valve assembly.

As best shown in FIG. 2, receptacle 12 includes therein an annular gas flow passage 38. Gas flow passage 38 includes a first end which terminates at the exterior surface of the receptacle. The opposite (second) end of gas flow passage 38 communicates through a passage 40 in outlet fitting 36 with one or more fuel storage tanks (not shown). As shown, fitting 36 is threaded to mate with a fuel supply line and provides access to a fuel tank or tanks (not shown) within the vehicle. Passage 40 has a diameter which is smaller than the diameter of the remainder of gas flow passage 38 which forces the pressure drop in the flow of gaseous fuel into the fuel storage tank(s) to occur downstream of the valve assembly. This feature also aids in preventing icing of the check valve assembly.

Within gas flow passage 38 is check valve, generally indicated at 42, which controls the flow of compressed gas between receptacle 12 and the fuel storage tank(s). Check valve 42 includes a poppet head 44 and a poppet shaft 46 extending therefrom. Poppet shaft 46 is slidably mounted within poppet guide 48. As best seen in FIG. 1, a preferred construction for poppet guide 48 includes three legs, extending outwardly at 120° angles which stabilize the guide within the gas flow passage in the valve body.

Poppet guide 48 itself is adapted to slide within the gas flow passage 38. It is normally biased by a spring 54 which urges poppet head 44 into a sealing relationship with O-ring 52. A poppet stop 56 which is threaded into one end of valve body 14 acts to secure the spring, poppet guide, and poppet in position within gas flow passage 38. Poppet stop 56 includes one or more orifices 58 therein through which gas flows.

As shown in the preferred embodiment, also positioned within valve body 14 is a by-pass valve, generally indicated at 60, which blocks a second gas flow passage 70. Second gas flow passage 70 includes a first leg 72 which extends through valve body 14 and communicates with gas flow passage 38 and a second leg 74 which provides an alternate gas flow path for the gaseous fuel around check valve 42. As can be seen in FIG. 2, second leg 74 communicates with gas flow passage 38 in receptacle 12 through an orifice 77.

By-pass valve 60 provides a means to bleed down all compressed gas in the fuel system through receptacle 12 prior to servicing and maintenance of the fuel system. By-pass valve 60 includes an internally threaded stem 62, a bonnet 64, a sealing gasket 66, and a gasket holder 68. An O-ring 78 and backup ring 80 together act to seal valve stem 64 and bonnet 62. As is conventional, backup ring 80 is manufactured of a higher durometer hardness rubber to prevent the softer O-ring from extruding through the gap between the valve stem 64 and bonnet 62. By-pass valve 60 is normally sealed against valve seat 76 in second gas flow passage 70.

To insure that a gas-tight seal is maintained over time, by-pass valve 60 includes a Belleville spring or washer 82 which exerts an active or "live" load against gasket 66. Gasket 66 is preferably fabricated of a resilient polymer such as a polyamide (for example Vespel (trademark), available from DuPont) which resists relaxation over time.

In operation, dust cap 18 is removed from the end of receptacle 12 and a compatible compressed natural gas supply nozzle (not shown) is attached to the end of receptacle 12. Because of the standard exterior profile of receptacle 12, any standard nozzle, including both ball-lock and jaw-lock style nozzles, may be used. Additionally, the exterior profile of receptacle 12 may be designed so that only properly rated nozzles may be attached.

Figure 3:
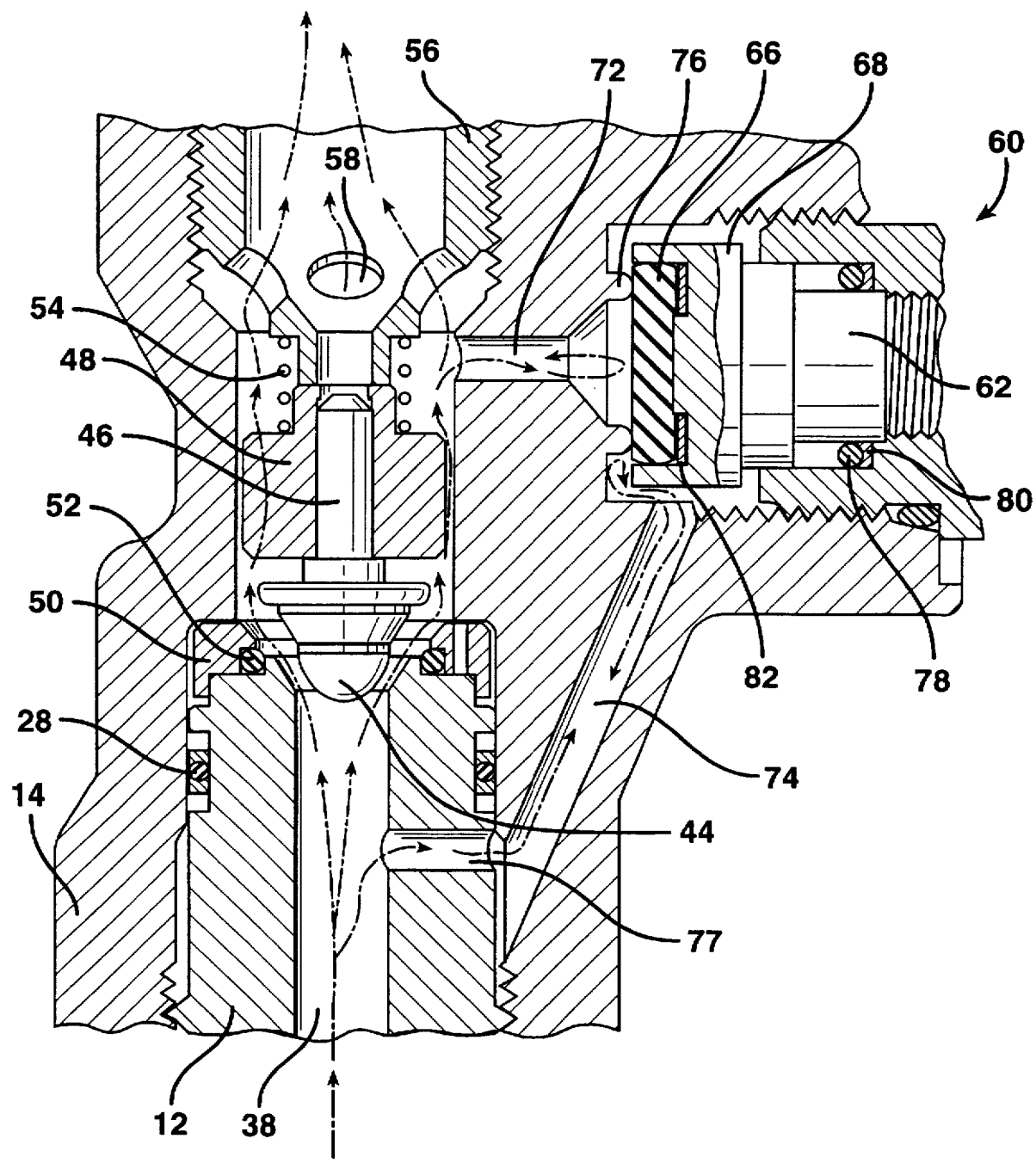
FIG. 3 is an enlarged cross-sectional view of the check valve and by-pass valve assembly when the assembly is in a fuel fill mode.

Once attached, gas flow is initiated through the nozzle and receptacle 12 and into first gas flow passage 38. Typically, the compressed natural gas fuel is supplied at a pressure of from about 2400 to 3600 psi (170 to 250 kg/cm$^2$), with allowances for temperature and pressure variations below and above the normal conditions. The pressure of the gas pushes against poppet head 44 in check valve 42 to open the valve and permit gas to flow directly through the check valve, orifices 58, passage 40, and into the fuel storage tank or tanks (not shown). The fuel-fill mode of the check valve is best illustrated in FIG. 3, where like elements are represented by like reference numerals.

Spring 54, or other equivalent biasing means, is designed so that a pressure differential of a little as 1 psi (0.07 kg/cm$^2$) will cause it to compress. The fuel will be filtered by filter 34 prior to passing out of the check valve assembly. By designing passage 40 to have a smaller diameter than the remainder of the gas flow passages through the valve, any pressure drops in the system will occur downstream of the valve. This further reduces the chances for any icing of the valve parts. By-pass valve 60 remains locked down, sealing second gas flow passage 70.

The substantially straight gas flow path which is provided by the design of the check valve assembly minimizes the amount of moisture which may become entrapped in the valve between uses. The design has no turns in the flow path for the gas and has no ledges, crevasses, or obstructions which could serve as collecting areas for moisture. Thus, the design prevents or at least minimizes the possibility that during the succeeding fuel fill cycle, entrapped moisture could freeze and cause icing which would cause the valve to stick in an open position.

Any adverse affects of icing are also minimized by the sliding construction of the poppet shaft 46 within poppet guide 48, which itself slides within gas flow passage 38. If moisture became entrapped between the shaft and guide and froze, the check valve would still be able to close after refueling as the guide would still slide to permit the poppet head to seal against O-ring 52. Alternatively, if moisture became entrapped and froze between the guide and the wall of gas flow passage 38, the poppet shaft would still slide to permit the poppet head to seal against O-ring 52.

Once the fuel storage tanks are recharged, gas flow is turned off, and check valve 42 automatically closes from the closing force exerted by spring 54 against poppet guide 48 and poppet shaft 46. Receptacle 12 is then depressurized via a three-way valve (not shown) in the nozzle which is opened to vent the small amount of gas in receptacle 12. The nozzle is then detached from the end of receptacle 12.

Because of the unique design, receptacle 12 in not pressurized except during refueling; at all other times, it is not under gas pressure. This construction provides a major advantage over prior art assemblies which have a check valve located in the receptacle. In those assemblies, the receptacle remains pressurized at all times, and, if sheared off in a crash, could release the compressed gas from the fuel storage tanks. Also, a pressurized receptacle complicates routine maintenance and service on a check valve assembly.

Figure 5:
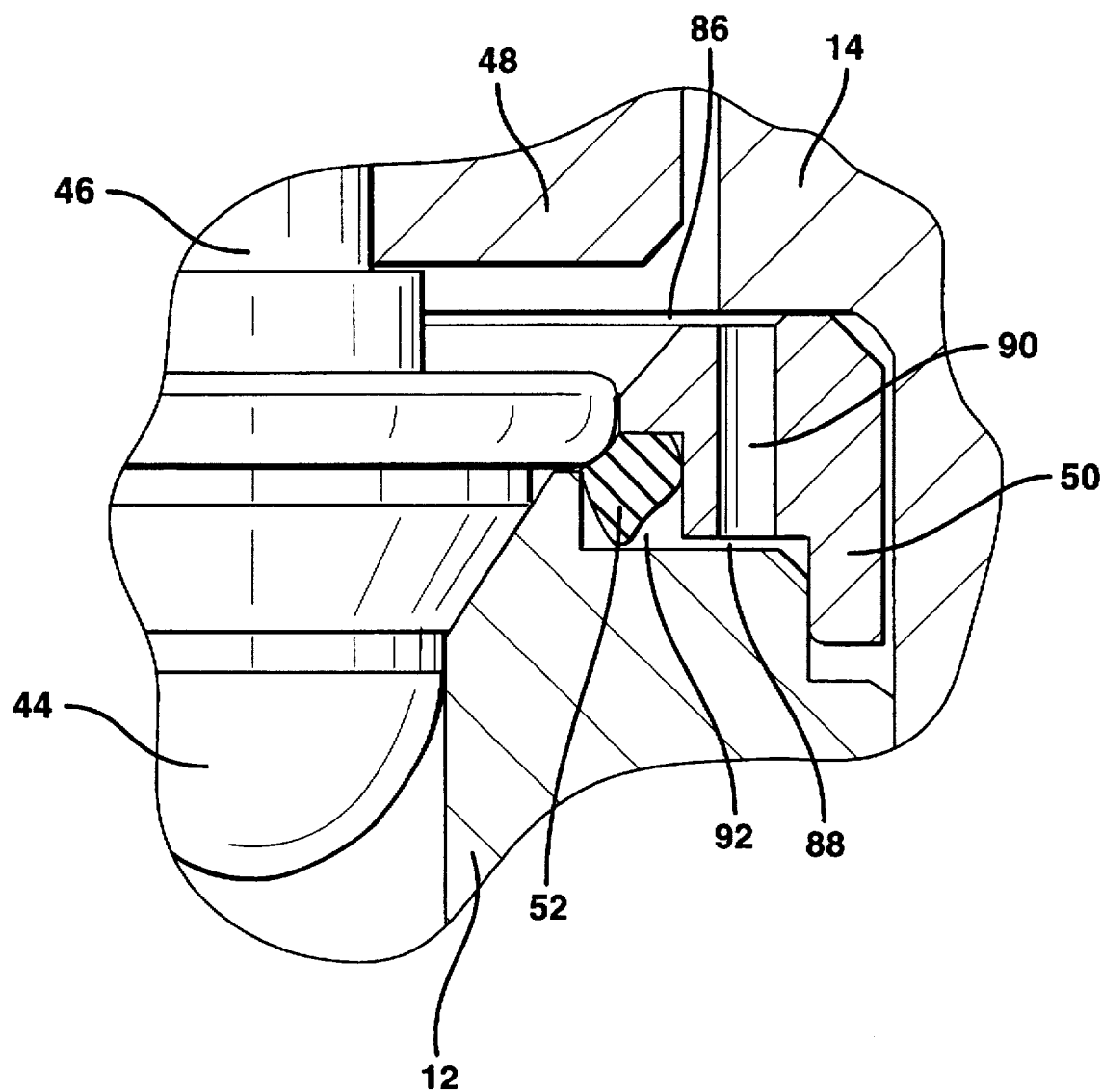
FIG. 5 is a greatly enlarged cross-sectional view of the captivated O-ring sealing against the poppet head and the bleed port to supply gas under pressure to the back side of the O-ring.

Referring now to FIG. 5, the seal which forms between poppet head 44 and O-ring 52 is shown and explained in greater detail. As the fuel storage tank(s) become pressurized, check valve 42 returns to a sealing position resting against an angled shoulder portion of the inner end of receptacle 12. Annular relief passages 86 and 88 and bleed port 90 in retainer member 50 provide a gas flow path around poppet head 44. Gas under pressure from the downstream side of check valve 42 (i.e., on the side in communication with the fuel storage tank(s)) is forced into relief passage 86, through bleed port 90, and relief passage 88 into an annular space 92 surrounding O-ring 52. As illustrated, this gas pressure presses and deforms O-ring 52 against the outer radius of poppet head 44.

To insure an effective and secure seal, poppet head 44 may be provided with a groove along its outer surface which creates a gas bleed path from the receptacle (upstream) side of gas flow passage 38 to O-ring 52. Thus, atmospheric pressure will be present on the upstream side of O-ring 52 to insure that it will be forced by the gas pressure behind it against the outer radius of the poppet head.

Figure 4:
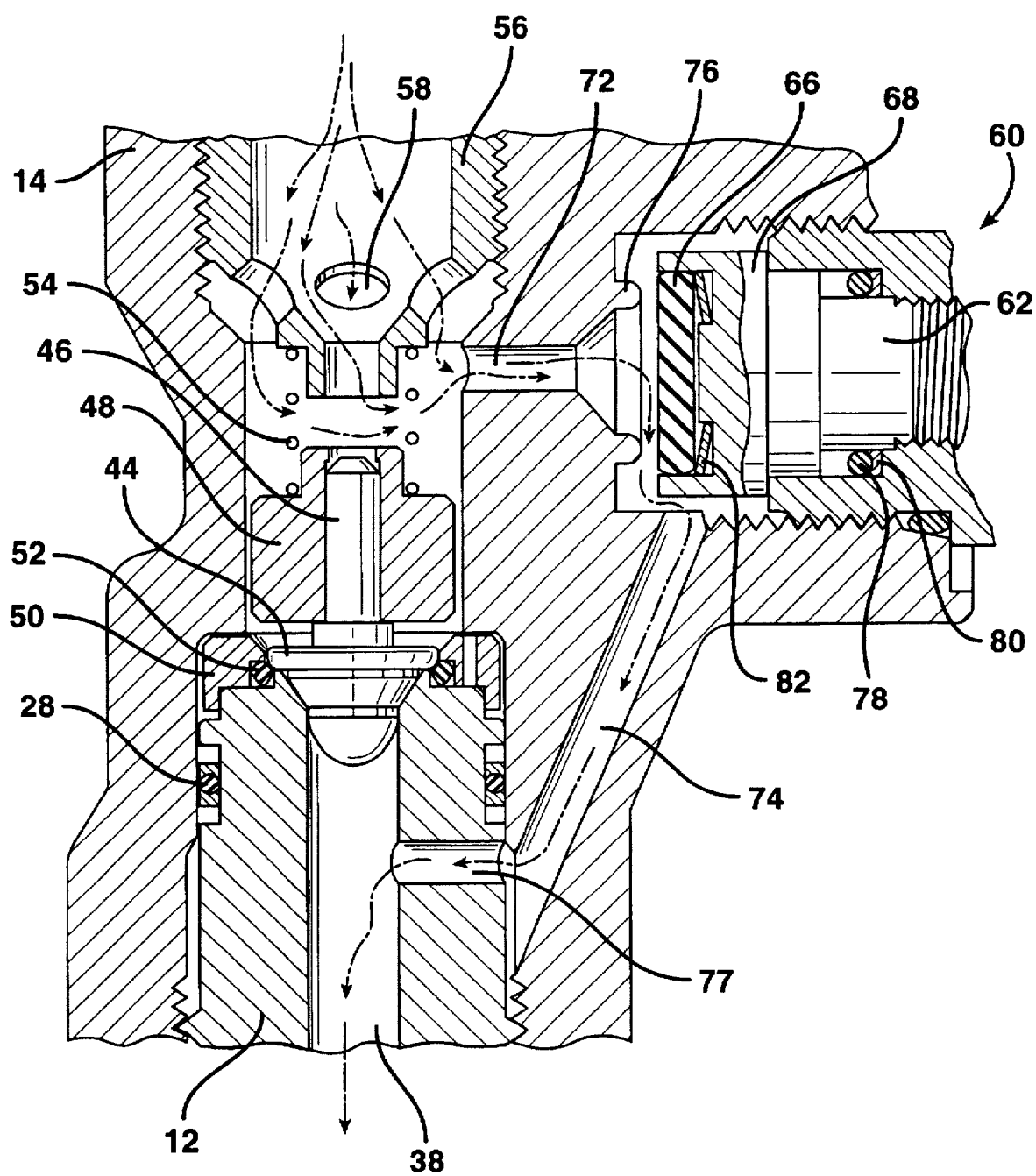
FIG. 4 is an enlarged cross-sectional view of the check valve and by-pass valve assembly when the valve is in a by-pass mode for venting fuel.

When service or maintenance of the valve assembly is needed, dust cap 18 is removed from the end of receptacle 12, and a vent pipe or line (not shown) is attached to the receptacle. Such a line may be used to recapture any gas within the fuel storage tanks. Stem 62 of by-pass valve 60 is rotated using an Allen wrench or other special tool which is adapted to fit the recess 84 in stem 62. Rotation is continued until gasket 66 is backed away from valve seat 76 to a position as shown in FIG. 4 and gas begins to flow through second gas flow passage 70 and then back into gas flow passage 38. Further rotation may be used to adjust to a desired bleed-down flow rate of gas from the fuel system. After compressed gas is completely bled from the fuel system, by-pass valve 60 is closed and the vent pipe is removed.

In the event that someone attempts to unthread receptacle 12 from the valve assembly without first depressurizing it, the design of the present invention still will provide a gas bleed path through the receptacle. As can be seen from FIG. 2, if receptacle 12 is unthreaded from valve body 14, backup and O-ring set 28 will be displaced by gas pressure from around retainer member 50 into the second leg 74 of gas flow passage 70. This, in turn, opens up a path through orifice 77 for the gas to bleed through into the interior of receptacle 12 and provides a warning to the user that the system is still pressurized.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An in-line fuel fill valve assembly for a compressed natural gas vehicle comprising:
   a) a receptacle adapted to mate with a fuel supply nozzle;
   b) a valve body having an in-line gas flow passage therethrough, said gas flow passage having first and second ends, said first end of said gas flow passage communicating with said receptacle, and said second end of said first gas flow passage terminating at an outlet which is adapted to communicate with a fuel storage vessel; and
   c) a check valve positioned in said first gas flow passage of said valve body, said check valve being normally biased into a closed position to prevent the flow of gas through said first gas flow passage and which opens in response to a flow of fuel under pressure.

2. An in-line fuel fill valve assembly as claimed in claim 1 in which said check valve includes a poppet having a head which is adapted to seal against a valve seat in said first gas flow passage.

3. An in-line fuel fill valve assembly as claimed in claim 2 in which said poppet head is comprised of a metal.

4. An in-line fuel fill valve assembly as claimed in claim 2 in which said valve seat includes a retainer member positioned against an inner wall of said valve body and including a resilient O-ring captivated by said retainer member and against which said poppet head seals.

5. An in-line fuel fill valve assembly as claimed in claim 4 in which said O-ring is out of the path of gas flow through said gas flow passage.

6. An in-line fuel fill valve assembly as claimed in claim 4 in which said retainer member includes a bleed port therein which communicates with said O-ring.

7. An in-line fuel fill valve assembly as claimed in claim 2 in which said poppet includes a shaft extending from said poppet head.

8. An in-line fuel fill valve assembly as claimed in claim 2 in which said poppet is biased against said valve seat by a spring.

9. An in-line fuel fill valve assembly as claimed in claim 7 including a poppet guide which is slidable in said first gas flow passage in said valve body, said poppet guide including an annular opening therein into which said poppet shaft is slidably fitted.

10. An in-line fuel fill valve assembly as claimed in claim 3 in which said receptacle includes a first end which is adapted to mate with said fuel supply nozzle and a second end which is secured within said valve body and seals against said retainer member.

11. An in-line fuel fill valve assembly as claimed in claim 1 including a filter for removing particulate matter from the fuel.

12. An in-line fuel fill valve assembly as claimed in claim 1 including a dust cap adapted to fit over an end of said receptacle.

* * * * *